United States Patent [19]

Biller

[11] Patent Number: 4,973,084
[45] Date of Patent: Nov. 27, 1990

[54] MECHANISM FOR THE HEIGHT ADJUSTMENT OF A SAFETY BELT DEFLECTION FITTING

[75] Inventor: Joachim Biller, Leinzell, Fed. Rep. of Germany

[73] Assignee: TRW Repa GmbH, Fed. Rep. of Germany

[21] Appl. No.: 440,228

[22] Filed: Nov. 22, 1989

[30] Foreign Application Priority Data

Nov. 23, 1988 [DE] Fed. Rep. of Germany ....... 3839511

[51] Int. Cl.⁵ .............................................. B60R 22/20
[52] U.S. Cl. .................................. 280/808; 248/297.3
[58] Field of Search ............... 292/268, 270, DIG. 60; 280/808, 801; 297/483, 468; 248/297.3

[56] References Cited

U.S. PATENT DOCUMENTS 4,872,704 10/1988 Biller et al. ......................... 280/808
4,917,403 4/1990 Gyoda et al. ........................ 280/808

FOREIGN PATENT DOCUMENTS 0249910 12/1987 European Pat. Off. ............ 280/808
3431678 8/1985 Fed. Rep. of Germany .

Primary Examiner—Charles A. Marmor
Assistant Examiner—Karin Tyson
Attorney, Agent, or Firm—Tarolli, Sundheim & Covell

[57] ABSTRACT

A mechanism for the height adjustment of a safety belt deflection fitting consists of a loadbearing guide rail and an anchoring element which is vertically displaceable therein and to which the safety belt fitting is anchored. The anchoring element carries a loadbearing stop member which cooperates with spring-loaded pawl members which project into the linear movement path of said rigid stop member as long as they are not pressed by a release element into their release position. The release element comprises in addition to an actuating lug a blocking lug which in the actuated state of the release element projects into the path of the rigid stop member and consequently also cooperates with the pawl members. Unintentional skipping of the respective next lower detent position is eliminated by this construction.

7 Claims, 9 Drawing Sheets

U.S. Patent  Nov. 27, 1990  Sheet 1 of 9  4,973,084
FIG.1
FIG.1a
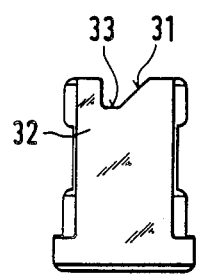
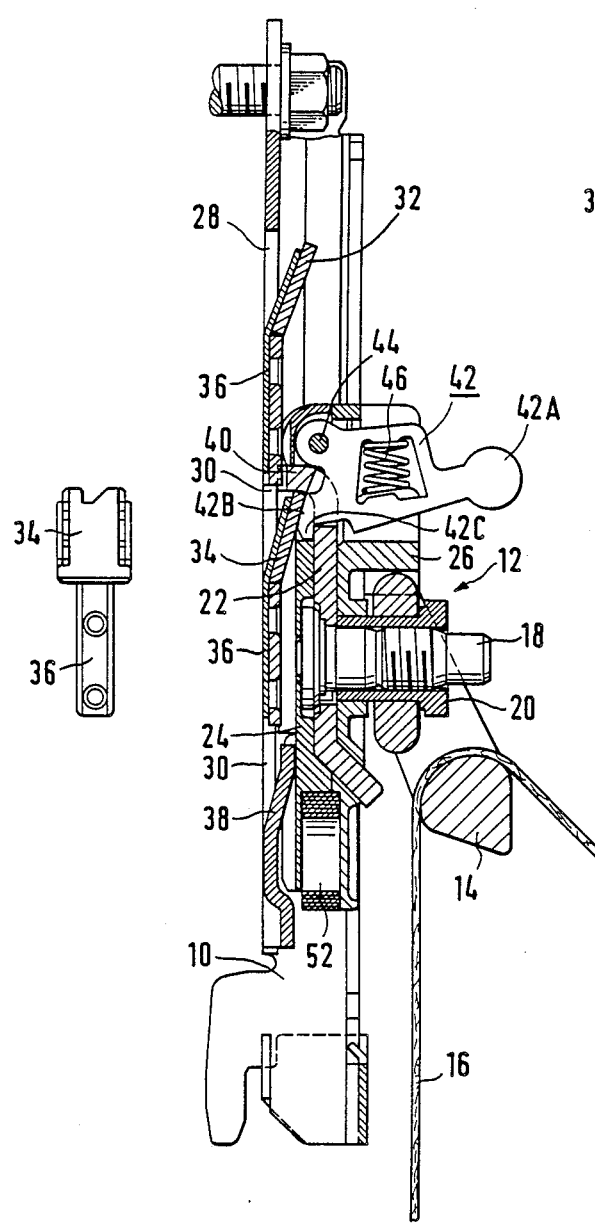

MECHANISM FOR THE HEIGHT ADJUSTMENT OF A SAFETY BELT DEFLECTION FITTING

The present invention relates to a mechanism for the height adjustment of a safety belt deflection fitting in motor vehicles; in particular a mechanism comprising a loadbearing guide rail adapted to be mounted on the vehicle, an anchoring element which is displaceably received in said guide rail and to which the safety belt fitting is secured, and a detent means comprising a plurality of detent elements spaced apart in the longitudinal direction of the guide rail, a detent element on the anchoring element cooperating with said detent elements and a release element cancelling in the actuated state the interlocking between the detent elements.

Such mechanisms are known in numerous constructional forms. Usually, the release element of such a means is formed as lever by the actuation of which a spring-loaded detent pawl or the like is moved into its release position. The detent pawl is mounted on the displaceable anchoring element and cooperates with detent openings of the guide rail which are spaced apart in the longitudinal direction. As long as the release element remains actuated the detent pawl cannot drop into one of the detent openings. On downward adjustment of the safety belt fitting it can therefore easily happen that the detent opening located at the desired height is skipped. A certain locating of the respective nearest detent opening requires careful attention on the part of the user.

A major object of the invention is to provide a mechanism for the height adjustment of a safety belt deflection fitting which ensures that said fitting is always adjusted to the next lower detent position without skipping any of the intervening detent positions. According to the invention the release element comprises a blocking lug which in the actuated state of the release element and on downward displacement of the anchoring element describes a path which meets the respective next lower of the detent elements of the guide rail which with the exception of the lowermost detent element are each constructed as pawl movable against spring force out of the normal detent position into a release position, that the blocking lug in the actuated state of the release element and on downward displacement thereof meets a ramp face of a movable pawl, that each of the movable pawls is mounted resiliently deflectably transversely of the direction of the downward movement and is deflected by runup of the blocking lug and that the blocking lug in the unactuated state of the release element moves back from the pawl, whereupon the latter returns to its undeflected position, and on renewed actuation of the release element an actuating lug thereof presses the pawl into its release position and releases the path for a further downward displacement. With this configuration of the vertical adjustment means it is not possible to unintentionally skip a detent position. As long as the release element is actuated to carry out a downward adjustment of the safety belt fitting the blocking lug of the release element moves on a path which necessarily encounters the next lower detent element. If however after cancelling the locking the actuation of the release element is ceased and the downward movement of the safety belt fitting for example continued by direct engagement on said fitting, locking automatically occurs in the next lower detent position.

Contrary to conventional constructions of vertical adjustment means for safety belt fittings in which the detent elements of the guide rail are formed as detent openings and the detent element on the anchoring element is constituted by a pawl, in the means according to the invention the detent elements of the guide rail are each formed as a pawl which is movable against spring force out of the normal detent position into a release position. Furthermore, in the means according to the invention it is ensured that the downard movement of the anchoring element to which the safety belt fitting is secured takes place in continuous sections. In a vertical adjustment means according to the preamble which is the subject of patent application P 37 33 026.8-22 of the same. Applicants the downward movement of the anchoring element is stopped by the blocking lug integrally formed on the release element striking the next lower detent element of the guide rail but, after the release element has been let go, a downward movement of the anchoring element over a distance of a few millimeters can take place until the rigid stop portion of the displaceable anchoring element strikes the upper edge of the same detent element of the guide rail. Such a division of the downward movement of the anchoring element into two successive sections is avoided by the construction of the means according to the invention. When the release element is actuated and on downward displacement of the anchoring element firstly the blocking lug of the release element runs onto the ramp face of the detent element of the guide rail and deflects said detent element transversely of the displacement direction until the blocking lug has reached the base of the ramp face and the further downward movement is blocked. If the safety belt fitting is not to remain at the height thus reached the release element is again actuated and pressed with its actuating lug against the pawl which is now pivoted back into its detent position and forms the detent element of the guide rail in order to press said pawl into its release position. By continuing actuation of the release element the anchoring element is displaced further downwardly until the blocking lug of the release element meets the next lower detent element of the guide rail where the operation can repeat itself if this is not the lowest detent element of the guide rail.

In advantageous further development of the invention the detent element of the anchoring element is formed as rigid stop member into the path of movement of which the pawls project in their detent position. The constrained locking in the respective next lower detent position is achieved with this embodiment in particularly simple manner.

In a further advantageous embodiment the release element is constructed as two-arm lever, the one lever arm serving as actuating lever and on the other lever arm both the actuating lug and the blocking lug being formed. The lever is preferably pivotal within a range limited by stops and is biased by a spring into the unactuated position.

Further features and advantages of the invention will be apparent from the following description of a preferred embodiment and from the drawings to which reference is made and in which:

FIG. 1 shows a schematic longitudinal section of the means;

FIG. 1a shows a movable pawl which forms a detent element of the guide rail of the means.

Figure 2:
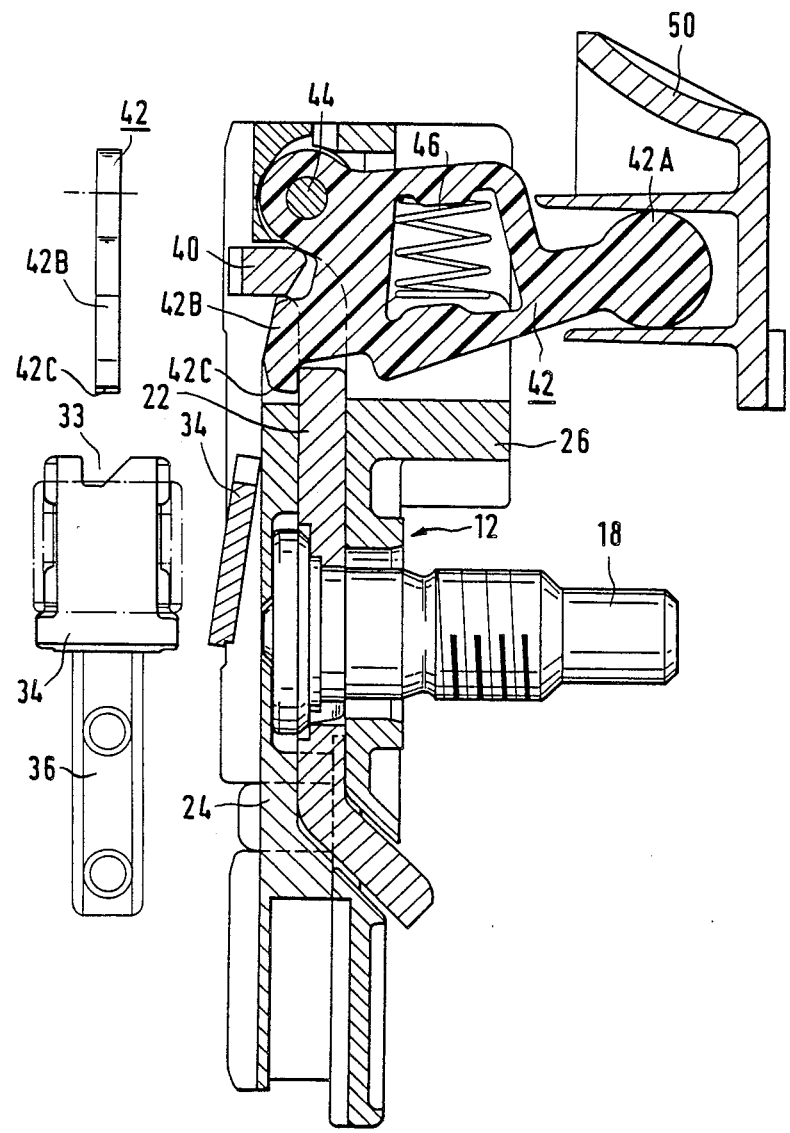
FIGS. 2 to 9 show schematic longitudinal sections of the apparatus in various positions.
Figure 3:
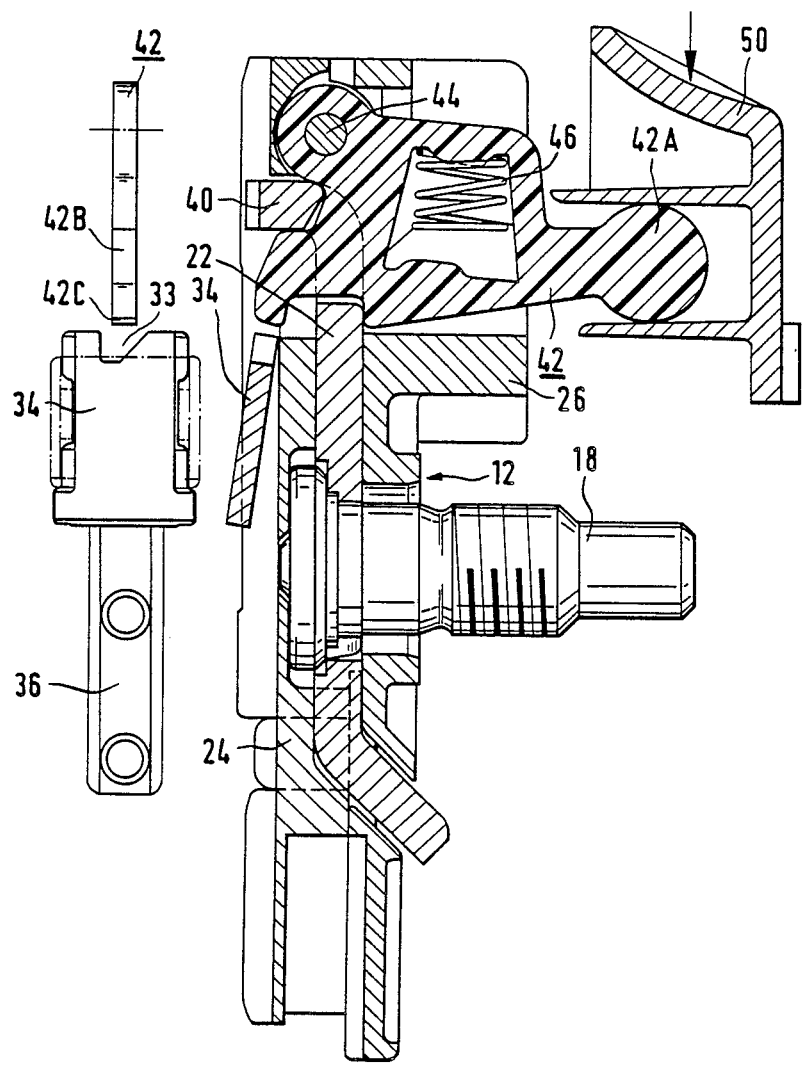
Figure 4:
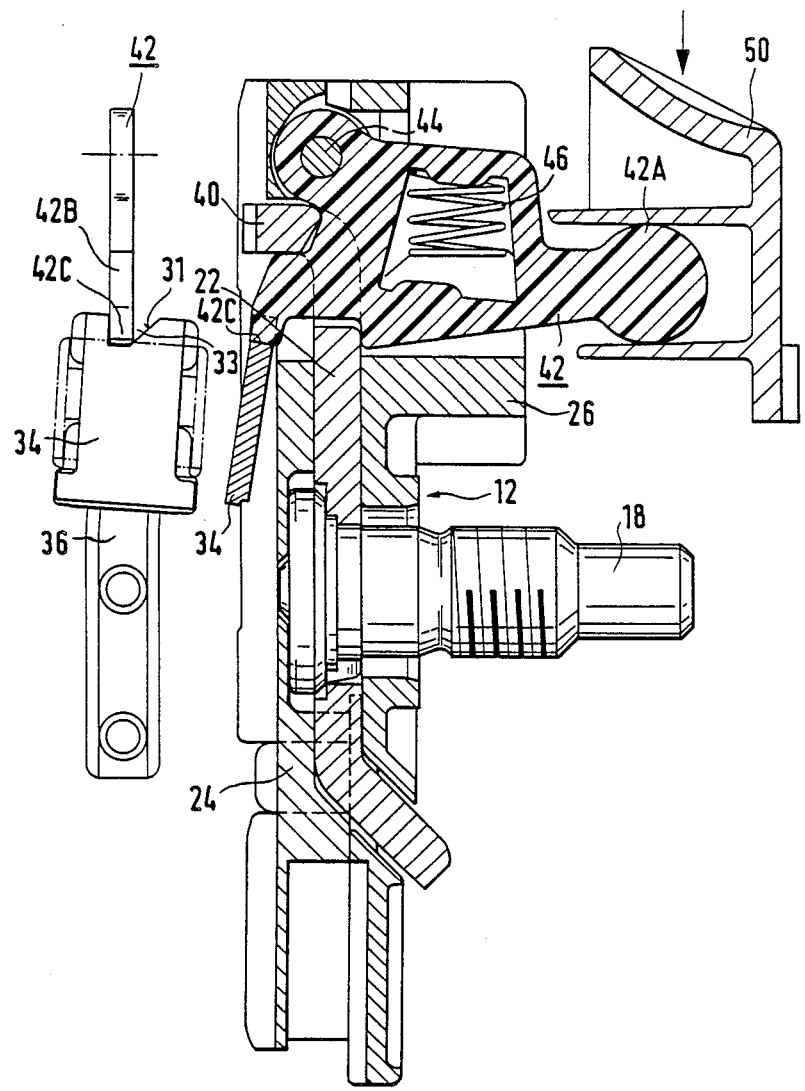

A loadbearing guide rail 10, intended for mounting on the B post of a motor vehicle, forms on the inside a linear guide path for a slidingly displaceable anchoring element which is denoted generally by 12. A safety belt fitting 14 for a safety belt 16 is pivotally connected to said anchoring element 12 by means of a threaded bolt 18 and a sleeve-like threaded nut 20. The loadbearing element of the anchoring element 12 is formed by a plate 22 of steel which is held between two outer housing members 24, 26 of the anchoring element 12 and has an opening through which the threaded bolt 18 is past.

The guide rail 10 comprises in its centre web two rectangular openings 28, 30 of which the lower edge is formed in each case as abutment of a plate-shaped pawl 32, 34 which however in the unloaded state remains a slight distance from said abutment. The pawls 32, 34 are pivotal about the region of their lower edge between a detent position inclined out of the plane of the centre web of the guide rail 10, into which they are respectively biased by a leaf spring a resilient return and holding member, serving simultaneously as holding means, and a release position which lies approximately in said plane and in which they penetrate into the associated opening 28 and 30 respectively. The position of the openings 28, 30 corresponds in each case to a detent position of the anchoring element 12 within the guide rail 10. In the embodiment shown a total of three detent positions are provided, the two upper positions corresponding to the openings 28, 30 and the lowermost position being defined by a fixed detent element 38 which projects out of the centre leg of the guide rail 10 in the inward direction.

The pawls 32, 34 are furthermore adapted to be deflected outwardly transversely of the direction of the downward displacement of the anchoring element 12 and traversely of the direction of their pivoting, and they thereby describe a circular arc about the uppermost securing point of the leaf spring 36 on the guide rail 10 over a few angular degrees. The deflection movement of the pawls 32, 34 is produced by a blocking lug described below running onto a release element likewise described below.

A detent element on the anchoring element 12 cooperates with the pawls 32, 34 and the detent element 38 and is formed by a rigid stop member 40 bent at right angles from the plate 22. The rigid stop member 40 moves with the displaceable anchoring element 12 on a linear path of motion into which project the upper edges of the pawls 32, 34, when the latter are in their detent position, and the upper edge of the detent element 38. In FIG. 1 a detent position is shown in which the stop member 40 is arrested at the upper edge of the pawl 34 so as to take up a load.

For releasing the locking in the upper or centre detent position a release element 42 is provided which is formed as two-armed lever pivotally mounted about a pin 44 on the housing part 24, one arm of said lever forming an actuating lever 42A whilst on the other arm both an actuating lug 42B and a blocking lug 42C are formed. The release element 42 is biased by a spring 46 into the unactuated position. In this position the actuating lug 42B bears on the pawl 32 or 34 disposed in its detent position.

As shown by FIG. 1a the pawl 32 comprises in the region of its upper edge a recess 33 of which one side wall is defined by a ramp face 31. On actuation of the release element 42 by pressing the actuating lever 42A downwardly, starting from the position shown in FIG. 1 the actuating lug 42B presses the pawl 32 or 34 into its release position in which it penetrates into the corresponding opening 28 or 30 respectively of the guide rail 10 so that the rigid stop member 40 comes free of said pawl and a downward movement of the anchoring element 12 is possible.

The sequences occurring on further downward movement are illustrated in FIGS. 2 to 9.

In the state shown in FIG. 2 the anchoring element 12 is in a position between two detent positions. The blocking lug 42C still lies above the upper edge of the following pawl which in FIG. 32 is assumed to be the pawl 34. In the position shown in FIG. 3 an actuating pressure is exerted downwardly in the direction of the arrow indicated on the actuating lever 42A via a lining member 50. By said actuating pressure firstly the entire displaceable anchoring element 12 with the safety belt deflection fitting 14 is moved downwardly. Thereafter (FIG. 4) the lower edge of the actuating lug 42C runs onto the ramp face 31 of the pawl 34, the pawl 34 yielding laterally in that the leaf spring 36 is resiliently bent in its region between the pawl 34 and the upper securing point on the guide rail 10. As soon as the blocking lug 42C meets the bottom of the recess 33 further downward displacement of the release element 42 is blocked with the anchoring element 12.

Figure 5:
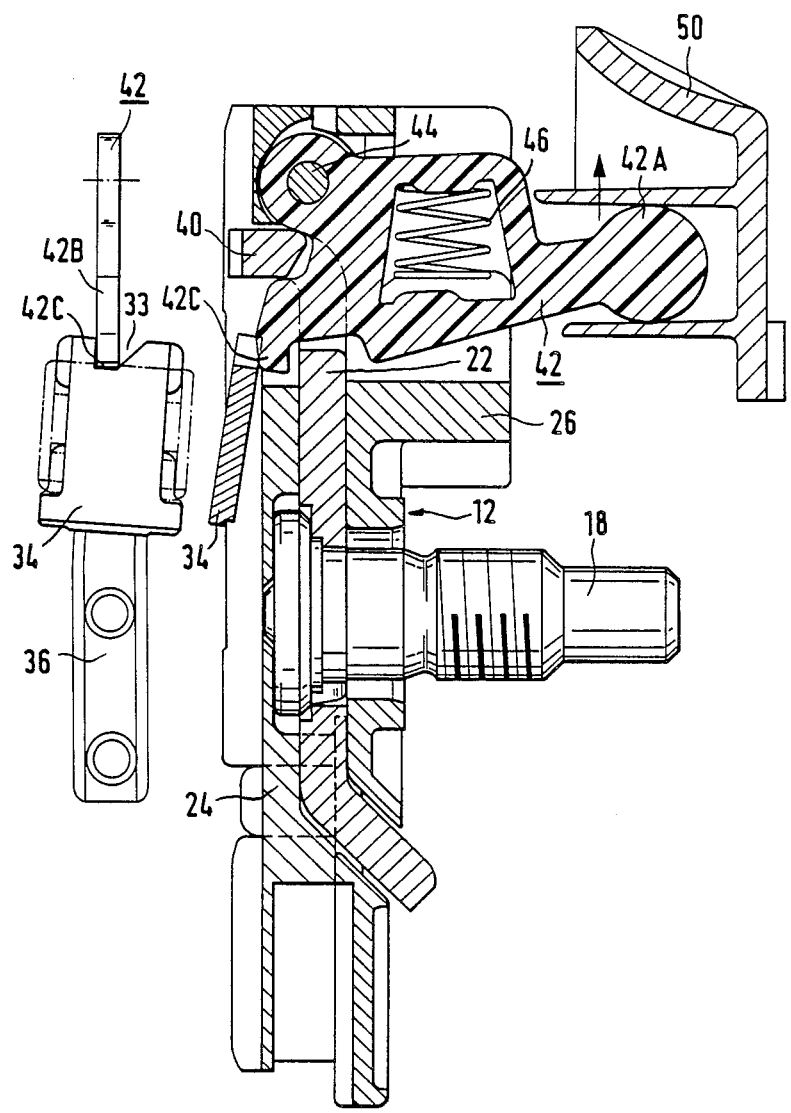
Figure 6:
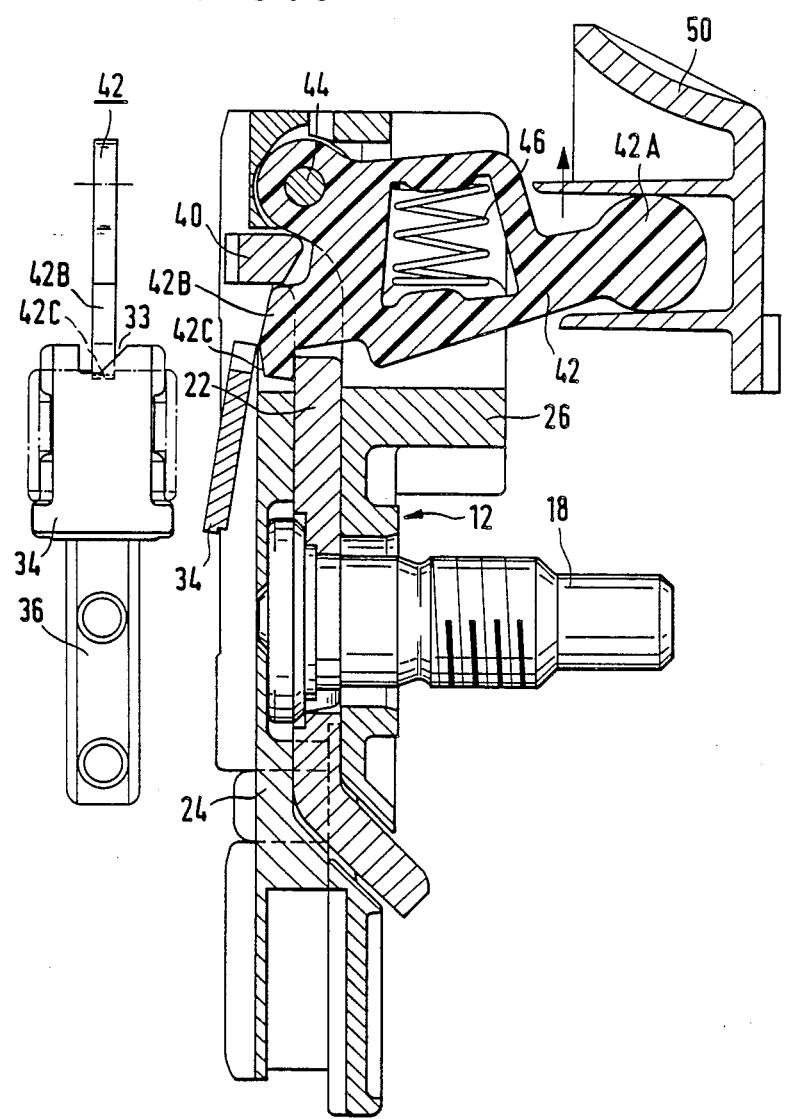
Figure 7:
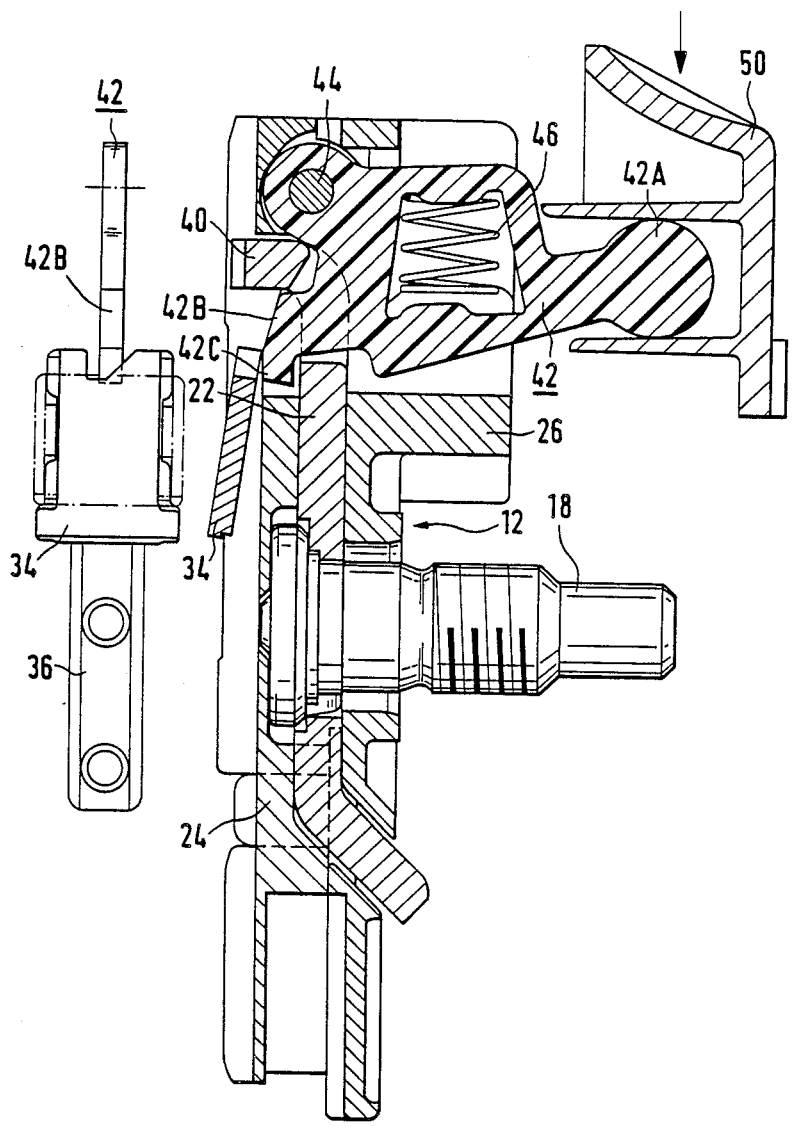
Figure 8:
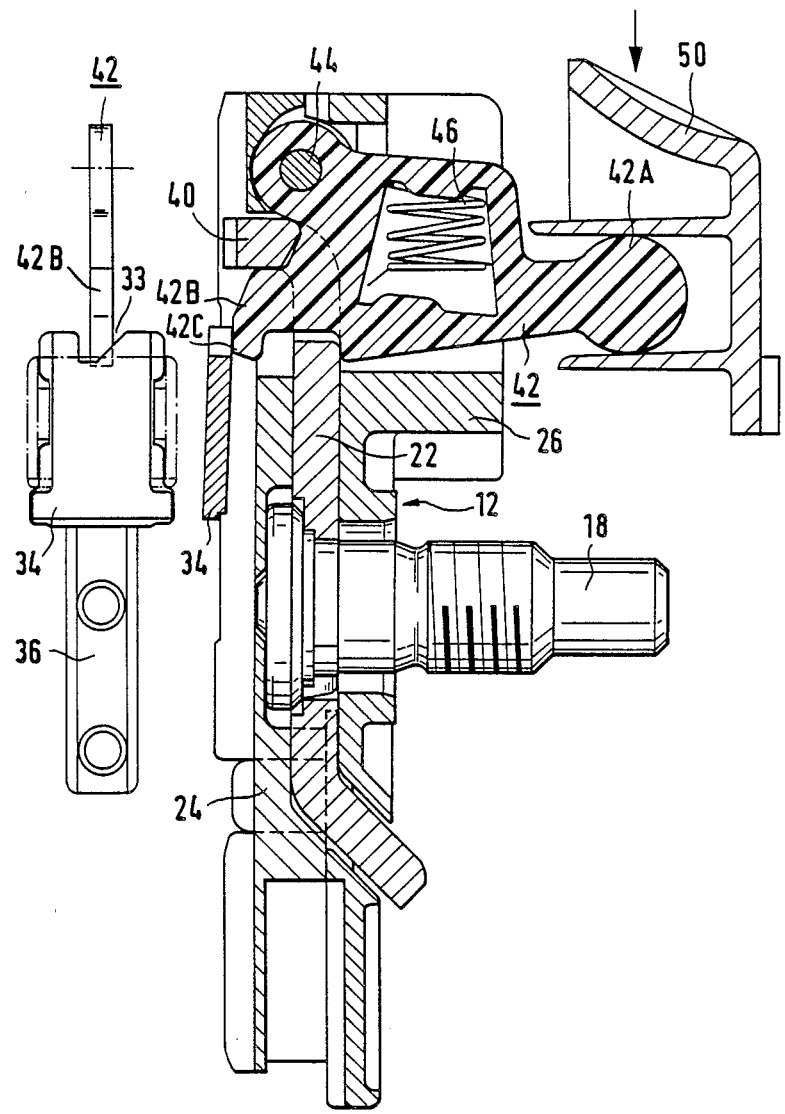
Figure 9:
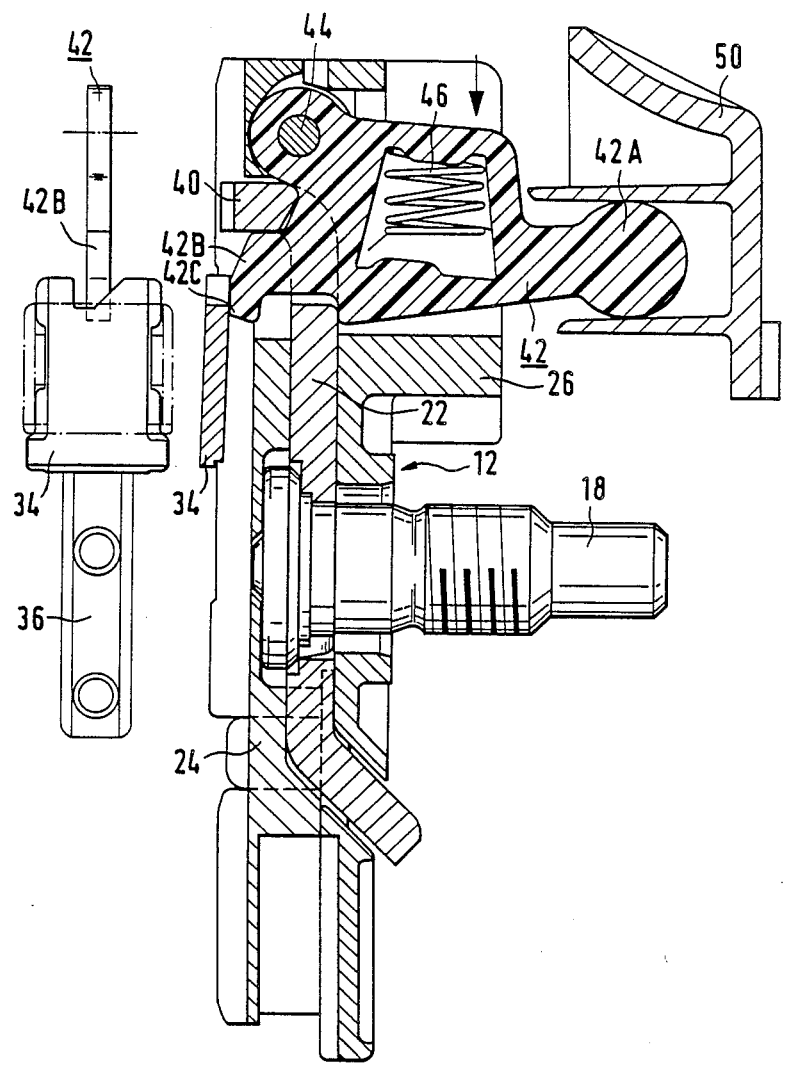

If now the user as indicated in FIG. 5 releases the actuating lever 42A the latter returns to its unactuated position in the direction of the arrow indicated. The blocking lug 42C gives way to the pawl 34, whereupon the latter pivots back into its undeflected position (FIG. 6). The displaceable anchoring fitting 12 with the safety belt deflection fitting 14 can remain in this position if no further downward movement is desired. If however a further downward displacement is desired, as indicated in FIG. 7 an actuating pressure is again exerted on the actuating lever 42A. The actuating lug 42B is now however opposite a face region of the pawl 34 which is not occupied by the recess 33 so that said actuating lug 42B meets the partial face of the pawl 34 defining the ramp face 31 and as shown in FIG. 8 pivots said pawl into its release position in which it penetrates into the associated recess 30 (FIG. 1) of the guide rail and releases the path for further downward movement. FIG. 9 shows the position which precedes the position shown in FIG. 1.

As apparent from the above description unintentional skipping of a detent position is fundamentally excluded. This means that an unerring and easy adjustment to the respective next lower detent position is ensured.

The embodiment described has still more special features. Thus, at the lower end of the two housing members 24, 26 a downwardly open partially cylindrical cutout is formed which receives a spirally coiled spring 52. The free end of said spring is attached to a suitable point of the guide rail 10. The spring 52 exerts an upwardly directed tension on the anchoring element 12 to compensate the downwardly directed tension exerted by the safety belt 16.

The number of detent positions provided depends on the particular requirements. In the lowermost position in each case no pivotable pawl like the pawls 32, 34 is required but only a rigid detent element like the detent element 38. To avoid obstructing the movement of the anchoring element 12 the rigid detent element 38 is provided with a central longitudinal slot into which the pivotal release element 42 can penetrate.

The means described consists of a few simple and easily assemblable components and consequently the desired unerring and easy location of the respective next detent position is achieved without particular expenditure.

What is claimed is:

1. A height adjustment mechanism for a deflection fitting of a safety belt restraint system in motor vehicles, comprising:

a loadbearing rail adapted to be mounted in the vehicle;

a slide mounted for sliding movement along said rail and carrying said deflection fitting;

cooperating detent means on said rail and on said slide for selectively blocking said slide in one of a plurality of different vertically spaced positions; and an actuating lever pivotally mounted on said slide to be movable between first and second positions;

said detent means comprising a plurality of pawl members spaced apart in the longitudinal direction of said rail and movable against spring force and in a first direction out of a normal locking position into a release position, and transverse to said first direction out of said normal blocking position into a deflected position; each of said pawl members having an edge provided with a recess defined on one side by a ramp face; and said actuating lever having a lug cooperating with said pawl edge to move said pawl member between said looking, release and deflected positions.

2. The mechanism of claim 1, wherein said actuating lever has a rigid stop extension into the path of movement of which said pawl members project in their normal locking position.

3. The mechanism of claim 1, wherein said actuating lever has a pivot range which is limited by stop members.

4. The mechanism of claim 1, wherein one detent element is provided on said rail as a rigid detent element projecting into the interior of said rail.

5. The mechanism of claim 1, wherein each of said pawl members is formed as a flat plate which is mounted by a resilient return and holding member deflectably in two mutually transverse directions which are transverse to the longitudinal direction of displacement of said slide.

6. The mechanism of claim 5, wherein said pawl members have a lower edge bearing on a support face of a recess which is formed in said rail and into which said pawl members retreat under pressure exerted on them by said lug.

7. The mechanism of claim 1, wherein each of said recesses is defined by a first lateral face extending from said edge inwardly of the respective pawl member, a bottom face and a second lateral face formed by said ramp face.

* * * * *

UNITED STATES PATENT AND TRADEMARK OFFICE
CERTIFICATE OF CORRECTION

PATENT NO. : 4,973,084
DATED : November 27, 1990
INVENTOR(S) : Joachim Biller

It is certified that error appears in the above-identified patent and that said Letters Patent is hereby corrected as shown below:

Column 6, Line 2, Claim 1, change "looking" to --locking--.

Signed and Sealed this

Thirty-first Day of March, 1992

Attest:

HARRY F. MANBECK, JR.

*Attesting Officer*  *Commissioner of Patents and Trademarks*